United States Patent
Brazhnyk et al.

(10) Patent No.: US 11,790,084 B2
(45) Date of Patent: Oct. 17, 2023

(54) SYSTEMS AND METHODS FOR PROTECTING CORE FILES IN A CONTENT MANAGEMENT SYSTEMS

(71) Applicant: Cloud Linux Software Inc., Estero (CH)

(72) Inventors: Serhii Brazhnyk, Odessa (UA); Igor Seletskiy, Palo Alto, CA (US)

(73) Assignee: CLOUD LINUX SOFTWARE, INC., Estero, FL (US)

( * ) Notice: Subject to any disclaimer, the term of this patent is extended or adjusted under 35 U.S.C. 154(b) by 235 days.

(21) Appl. No.: 17/520,844

(22) Filed: Nov. 8, 2021

(65) Prior Publication Data
US 2023/0144531 A1    May 11, 2023

(51) Int. Cl.
*G06F 21/54* (2013.01)
*G06F 21/56* (2013.01)
(Continued)

(52) U.S. Cl.
CPC .......... *G06F 21/563* (2013.01); *G06F 16/958* (2019.01); *G06F 21/51* (2013.01); *G06F 21/6218* (2013.01); *G06F 2221/034* (2013.01)

(58) Field of Classification Search
CPC ...... G06F 16/958; G06F 21/563; G06F 21/51; G06F 21/6218; G06F 2221/034;
(Continued)

(56) References Cited

U.S. PATENT DOCUMENTS

| 7,197,638 B1 * | 3/2007 | Grawrock | G06F 21/6218 726/30 |
| 2005/0091536 A1 * | 4/2005 | Whitmer | G06F 21/53 726/4 |

(Continued)

FOREIGN PATENT DOCUMENTS

| WO | WO-2014059933 A1 * | 4/2014 | G06F 21/56 |
| WO | WO-2015184752 A1 * | 12/2015 | G06F 21/56 |

OTHER PUBLICATIONS

Alghofaili, Rasha. "Security Analysis of Open Source Content Management Systems Wordpress, Joomla, and Drupal." Obtained online from <https://scholarworks.calstate.edu/downloads/z029p7034>, retrieved on Aug. 23, 2023. (Year: 2018).*

(Continued)

*Primary Examiner* — Farid Homayounmehr
*Assistant Examiner* — Zhimei Zhu
(74) *Attorney, Agent, or Firm* — ArentFox Schiff LLP; Michael Fainberg

(57) ABSTRACT

Disclosed herein are systems and method for protecting core files in a content management system (CMS). In one aspect, a method includes detecting execution of a script on a computing device. In response to determining that the script is located in the core folder and is not included in an exclude list that includes paths of scripts and files that are marked as not malicious, the method includes blocking the execution of the script. If the script is not in the core folder, the method includes determining whether the script will upload, to the core folder, a file that is not in the exclude list. In response (Continued)

to determining that the script will upload the file to the core folder, the method includes blocking write functions in the script during the execution.

19 Claims, 4 Drawing Sheets

(51) Int. Cl.
*G06F 21/51* (2013.01)
*G06F 21/62* (2013.01)
*G06F 16/958* (2019.01)

(58) Field of Classification Search
CPC .... G06F 21/554; G06F 21/562; G06F 21/566; G06F 21/568
See application file for complete search history.

(56) References Cited

U.S. PATENT DOCUMENTS

| | | | | |
|---|---|---|---|---|
| 2005/0257265 A1* | 11/2005 | Cook | ................... | G06F 21/566 |
| | | | | 726/23 |
| 2005/0257266 A1* | 11/2005 | Cook | ....................... | G06F 8/61 |
| | | | | 726/23 |
| 2012/0324377 A1* | 12/2012 | Allington | .................. | G06F 8/38 |
| | | | | 715/763 |
| 2013/0160084 A1* | 6/2013 | Hansen | ................... | G06F 21/53 |
| | | | | 726/4 |

OTHER PUBLICATIONS

Habib, Karar Mehdi, "Wordpress—A convenient content-management system (CMS)", Obtained online from <https://www.theseus.fi/handle/10024/148663>, retrieved on Aug. 23, 2023. (Year: 2018).*

* cited by examiner

SYSTEMS AND METHODS FOR PROTECTING CORE FILES IN A CONTENT MANAGEMENT SYSTEMS

FIELD OF TECHNOLOGY

The present disclosure relates to the field of data security, and, more specifically, to systems and methods for protecting core files in a content management system (CMS).

BACKGROUND

A content management system (CMS) platform is software that is widely used for website creation and management. Despite the multitude of unique websites that are created using any given CMS platform, a majority of the websites have the same directory structure given, at times, different names and a few different files. A specific group of "core files" provide the main functionality of the CMS and are thus vulnerable to malicious uploads and injections. For example, WordPress is a CMS platform with core files that are the PHP and related source files containing the main functionality of WordPress. Modifying these core files can cause security issues, compatibility issues, or any other issues that prevent normal operation of WordPress. However, malware is frequently dropped to WordPress core folders (e.g., "wp-admin" or "wp-includes") or injected into WordPress core files.

SUMMARY

Aspects of the disclosure describe methods and systems for protecting core files in a content management system (CMS). In particular, a proactive defense PHP module is described that prevents malware drops or direct execution of previously dropped malicious scripts.

In one exemplary aspect, the techniques described herein relate to a method for protecting core files in a CMS, the method including: detecting execution of a script on a computing device; determining whether the script is located in a core folder of the CMS; in response to determining that the script is located in the core folder, determining whether a path of the script is included in an exclude list that includes paths of scripts and files that are marked as not malicious; in response to determining that the path of the script is not in the exclude list, blocking the execution of the script; in response to determining that the script is not located in the core folder, determining whether the script will upload, to the core folder, a file that is not in the exclude list; in response to determining that the script will upload the file to the core folder, blocking write functions in the script during the execution.

In some aspects, the techniques described herein relate to a method, wherein blocking the write functions in the script during the execution further includes executing all other functions in the script that are not the write functions. More specifically, write functions related to core files still will be processed (only write functions related to non-core files such as the write functions not present in the core file by default will be blocked).

In some aspects, the techniques described herein relate to a method, further including: in response to determining that the script is in the exclude list, determining whether the script will upload, to the core folder, a file that is not in the exclude list; and in response to determining that the script will upload the file to the core folder, identifying a malicious injection in the script and blocking functions associated with the malicious injection.

In some aspects, the techniques described herein relate to a method, wherein blocking the execution of the script further includes: determining whether the script performs an include function or modification on an existing file in the core folder, wherein the existing file is in the exclude list; in response to determining that the script performs an include function or modification on the existing file in the core folder, blocking the include function or write functions associated with the modification.

In some aspects, the techniques described herein relate to a method, wherein blocking the execution of the script occurs on a RINIT level.

In some aspects, the techniques described herein relate to a method, further including: generating the exclude list by retrieving files and file paths for one or more of: (1) a latest version of the CMS, (2) previous version(s) of the CMS, (3) testing version(s) of the CMS, (4) verified 3rd-party tools for the CMS.

In some aspects, the techniques described herein relate to a method, wherein the exclude list is synchronized across a plurality of computing devices that includes the computing device.

In some aspects, the techniques described herein relate to a method, further including: receiving a custom exclusion entry to include in the exclude list on the computing device, wherein the custom exclusion entry is for a particular file; detecting the particular file; scanning the particular file for malware; in response to detecting malware in the particular file, incrementing a false negative count for the custom exclusion entry; synchronizing the false negative count across the plurality of computing devices; and in response to determining that the false negative count exceeds a threshold false negative count, removing the custom exclusion entry from the exclude list.

In some aspects, the techniques described herein relate to a method, further including: identifying a developer associated with the particular file; in response to detecting malware in the particular file, incrementing another false negative count for the developer; in response to determining that the another false negative count exceeds another threshold false negative count, removing all exclusion entries associated with the developer from the exclude list.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for protecting core files in a content management system (CMS). Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
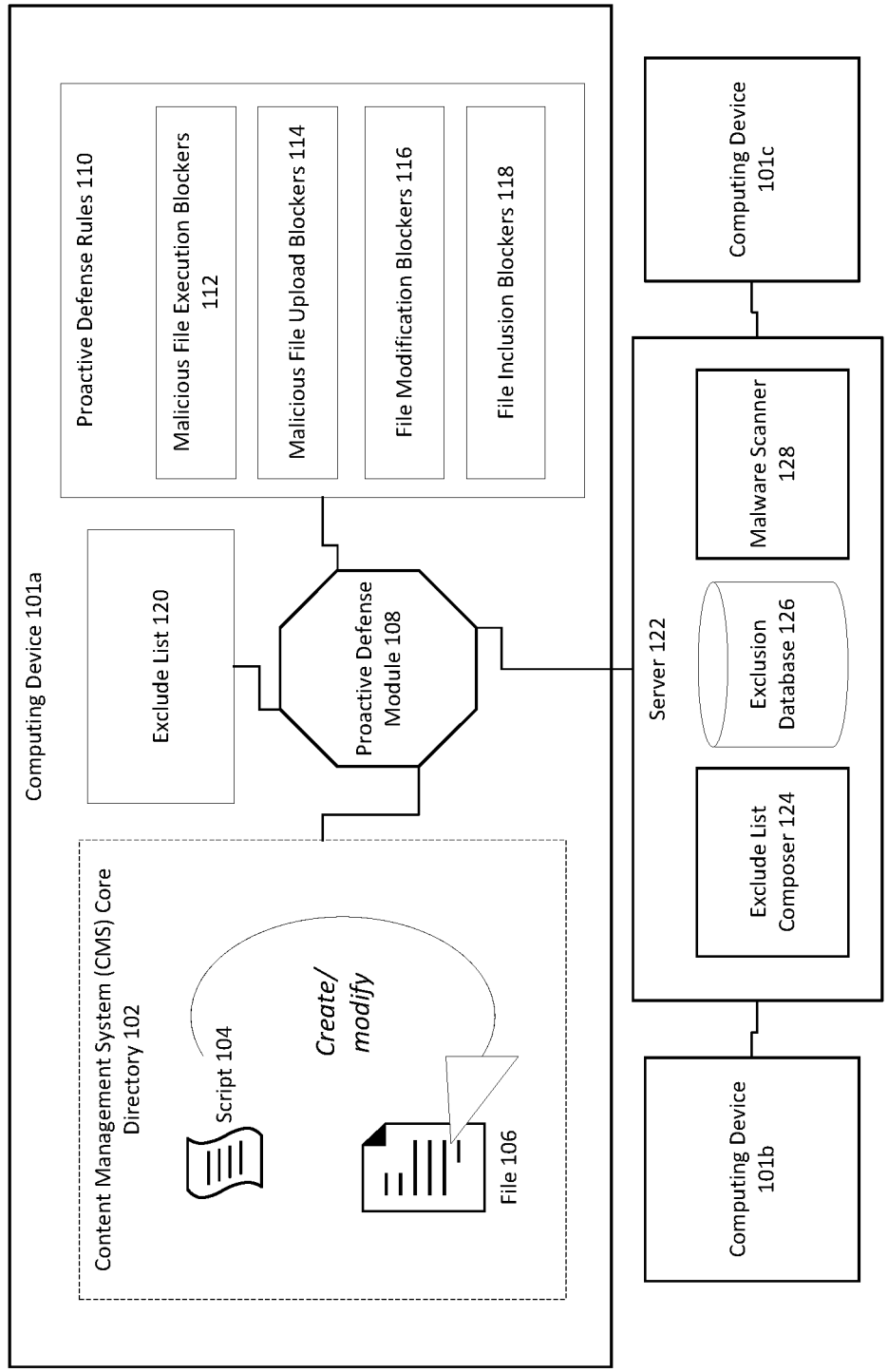
FIG. 1 is a block diagram illustrating a system for protecting core files in a content management system (CMS).

FIG. 1 is a block diagram illustrating system 100 for protecting core files in a content management system (CMS). System 100 includes computing devices 101a, 101b, and 101c and server 122. Server 122 and computing devices 101 are computer systems described in FIG. 4. For example, computing device 101a may be a laptop computer and computing device 101b may be a tablet. It should be noted that only three computing devices and one server are shown for simplicity, but one skilled in the art will appreciate that any number of computing devices and servers may be part of system 100. Computing devices 101 may all be connected to each other in a network (e.g., of an organization, institution, or company). CMS core directory 102, which may be one or more core folders, includes script 104 and/or file 106. Examples of a CMS include WordPress, Joomla, Drupal, Magento, Squarespace, etc. Because WordPress is commonly used, the present disclosure mostly provides WordPress examples.

Proactive defense module 108 may be a binary program that is embedded in PHP and is configured to detect executions of scripts in core directory 102 or execution of scripts on computing device 101 that affect scripts and/or files in core directory 102. Ultimately, the objective of proactive defense module 108 is to stop the work of scripts that harm the device where the script is being executed. Proactive defense module 108 utilizes a plurality of rules (e.g., proactive defense rules 110) to detect malicious activity in the CMS. In general, there are four types of rules in proactive defense rules 110 that pertain to files in core directory 102: malicious file execution blockers 112, malicious file upload blockers 114, file modification blockers 116, and file inclusion blockers.

Proactive defense module 108 also refers to exclude list 120, which includes paths and file identifiers for files that may be exceptions (particular to a website, a user, or a developer). As websites are updated periodically and upgrades occur in the CMS, exclude list 120 may change over time. Exclude list composer 124 is a server-side application that updates exclude list 120 with new entries.

Proactive defense module 108 may be stored on each of the computing devices and server 122. Although proactive defense module 108, exclude list 120, and proactive defense rules 110 are shown as separate entities, exclude list 120, proactive defense rules 110, exclude list composer 124, exclusion database 126 (discussed further below), and malware scanner 128 (discussed further below) are all components of proactive defense module 108. Thus, all actions described are performed by proactive defense module 108, whether performed on a computing device or a server. In some aspects, the type of proactive defense module 108 may depend on where it is installed. For example, server 122 may have a thick client application version of proactive defense module 108 and each of the computing devices may have a thin client application version. The thick client application may generate exclusion lists, track performance of exclusions across all computing devices, and scan for malware. The thin client application may receive exclusion entries and evaluate scripts and/or files using proactive defense rules 110.

In an exemplary aspect, proactive defense module 108 may identify the core folder (used interchangeably with directory) and core files associated with the CMS. For example, in WordPress, the core folders include "wp-admin/" and "wp-includes/" and the core files are located in said core folders. In some aspects, the core folders/directories are tagged by the CMS and proactive defense module 108 generates rules 110 based on the tagged core folders. Specifically, proactive defense module 108 creates regular expressions of the paths to the core folders and includes them in rules 110. Subsequently, proactive defense module 108 detects execution of script 104 and collects information about the script path to compare against rules 110.

A rule in rules 110 may be structured with one or more conditions and one or more actions for when the conditions are satisfied. In some aspects, the rule is structured as an if/else statement.

The first type of rule includes malicious file execution blockers 112, which check for known malicious files in core directory 102. For example, a rule part of blockers 112 may evaluate whether the path of script 104 matches the regular expression ^(?!.*(?:wp\-content|wp[_-]booster|\/\.cache)).*\/wp-(?:includes|adm-in)\/.*$. If the path matches the regular expression, the rule determines whether the path of script 104 exists in exclude list 120. If the path does not exist in exclude list 120, proactive defense module 108 prevents script execution.

Suppose that the script is written in PHP. In terms of the PHP lifecycle, if running command line interface (CLI) during PHP startup, C main( ) is run. Startup is referred to as a module startup step. This is abbreviated as the MINIT step. Whenever a new request shows in to be treated, PHP runs a request startup step. This is abbreviated as the RINIT step. The request is served and it is shut down. Shutting down a request is called the request shutdown step. This is abbreviated as the RSHUTDOWN step.

In some aspects, proactive defense module 108 prevents script execution on the RINIT level (or the equivalent on a different language environment). Thus, the rule may be structured as:

Condition 1:
script_path matches ^(?!.*(?:wp\-content | wp[_-]booster|\/\.cache)).*\/wp-(?:includes | adm-in)\/.*$)
Condition 2:
script_path in exclude_list
Actions:
Conditions Satisfied: Execute script
Conditions Not Satisfied: Block script execution on RINIT level The second type of rule includes malicious file upload blockers 114, which prevent the upload of malicious files (e.g., file 106) to core directory 102 and its sub-directories. For example, a rule part of blockers 114 may evaluate whether the path of file 106 created by script 104 will match the regular expression ^(?!.*(?:wp\-content|wp[_-]booster|\/\.cache)).*\/wp-(?:includes|adm-in)\/.*$. If the path matches the regular expression, the rule determines whether the path of file 106 exists in exclude list 120. If the path does not exist in exclude list 120, proactive defense module 108 blocks script drop functions such as file_put_contents, fopen, fwrite, etc. In some aspects, the remainder of code in script 104 is allowed to run. This enables for the valid script functions to be executed (i.e., the site will work correctly), while possible injected malicious code will not be processed and no errors will occur. For example, consider the following output of a script:

```
> cat lib/dup_archive/classes/processors/class.duparchive.processor.file.php
~
<?php
file_put_contents('/home/wp486/public_html/wp-admin/css/media-rtl.min.css', "dsds");
$ds = file_get_contents('/home/wp486/public_html/wp-admin/css/media-rtl.min.css');
print($ds);
echo "still works";
?>
```

Even if the file_put_contents function is blocked, the remainder of the script can work just fine:

```
> php lib/dup_archive/classes/processors/class.duparchive.processor.file.php
~
123still works
```

However, because the write and opening functions are blocked from execution, malicious file 106 is not uploaded to core directory 102.

The third type of rule includes file modification blockers 116, which protect legitimate core files from malicious modification. For example, a rule part of blockers 116 may evaluate whether the path of a modified file (e.g., file 106) will match the regular expression ^(?!.*(?:wp\-content|wp[_-]booster|\/\.cache)).*\/wp-(?:includes|adm-in)\/.*$. If the path matches the regular expression, the rule determines whether the path of file 106 exists in exclude list 120 and whether an identifier of script 104 exists in exclude list 120. If the path or script identifier does not exist in exclude list 120, proactive defense module 108 blocks script drop functions such as file_put_contents, fopen, fwrite, etc. In some aspects, the remainder of code in script 104 is allowed to run. In this case, it should be noted that if the path of script 104 is in excluded list 120, but the path of file 106 is not, it is likely that script 104 has been injected by malicious code.

The fourth type of rule includes file inclusion blockers 118, which forbid malicious file includes. For example, a rule part of blockers 116 may evaluate whether the path of an included file (e.g., file 106) will match the regular expression ^(?!.*(?:wp\-content|wp[_-]booster|\/\.cache)).*\/wp-(?:includes|adm-in)\/.*$. If the path matches the regular expression, the rule determines whether the path of file 106 exists in exclude list 120. If the path does not exist in exclude list 120, proactive defense module 108 blocks script include functions such as include, include_once, require_once, require, etc. In some aspects, the remainder of code in script 104 is allowed to run.

Exclude list 120 is applicable regardless of the version of a particular CMS. For example, regardless of the WordPress version being used, exclude list 120 may be used to avoid false positives successfully. As discussed previously, exclude list composer 124 compiles and updates exclude list 120. Exclude list composer 124 may retrieve a list of the latest CMS version files by parsing API responses of the CMS. For example, exclude list composer 124 may obtain the list of the latest WordPress version files by parsing the WordPress API (https://codex.wordpress.org/WordPress.org API) responses. In some aspects, exclude list composer 124 may first retrieve files and the list of file paths for the latest version of the CMS. Exclude list composer 124 may then retrieve the list of file paths that were present in the previous versions of the CMS, but were removed from the latest version. For example, in the case of WordPress, exclude list composer 124 may parse the "wp-admin/includes/update-core.php," which contains the required list. In some aspects, exclude list composer 124 may additionally retrieve files and the list of file paths for any testing (e.g., beta) version of the CMS. For example, exclude list composer 124 may collect files and the file paths of the WordPress Beta/Nightly version.

Exclude list composer 124 compiles the list of unique file paths out of these three sources and considers this as a list of legitimate files to be included in exclude list 120. With all three sources, the likelihood of false positives is reduced for beta version users, outdated version users, and latest version rollout users. Exclude list composer 124 periodically updates the entries of exclusion (e.g., every week).

In general, it is highly recommended by CMS core developers to avoid modifying core files or storing $3^{rd}$ party files in core directories. Nonetheless, certain plugin and theme developers ignore such recommendations. In some aspects, exclude list 120 may include a custom exclusion portion that address false positives caused by such developers. For example, in terms of WordPress, exclude list composer 124 may include 3$^{rd}$ party WordPress Toolkits Panels scripts (e.g. cPanel, Plesk, etc.) and backup-plugin scripts.

Exclude list composer 124 stores a universal list of exclusions in exclusion database 126, which is synchronized with exclude list 120 in computing device 101a. In some aspects, a user of computing device 101a may add file identifiers and paths to exclude list 120. These added exclusion entries may be uploaded to server 122 and synchronized with exclusion database 126. Exclusion database 126 may further track the amount of times an exclusion has been invoked. For example, entries in exclusion database 126 may be synchronized with each exclude list in computing device 101b and 101c. Whenever an exclusion is invoked for a particular file (e.g., file 106) that has been added to exclude list 120 by computing device 101a, an exclusion count is incremented in exclusion database 126. If the exclusion causes malicious activity a threshold number of times (e.g., 3) on any combination of devices 101, the exclusion is removed from the list. For example, subsequent to an exclusion, proactive defense module 108 may send file 106 to server 122 for malware analysis by malware scanner 128. Based on the malware scan verdict, exclude list composer 124 may update exclusion database 126. In this way, proactive defense module 108 can dynamically manage the new features of 3rd-party developers and cover previously unknown malware samples with rules to improve the malware detection rate across multiple devices. In other words, an exclusion on one device can prevent a false positive on a second device. The threshold number of times may be greater than one because a malicious injection may cause a file or script to malfunction and that does not mean that the file or script should be removed from an exclude list entirely. Nonetheless, for improved security, the file or script are scanned by malware scanner 128 for cases when there is an instance of malicious activity associated with the file or script in the exclude list.

Exclusion database 126 also tracks which developers are associated with the exclusions that are in fact false negatives. In some aspects, if a developer has been associated with at least a threshold number of false negatives where a user opts to exclude a path that ends up being malicious, all exclusions associated with the developer may be removed from exclusion database. It should be noted that the threshold number of false negatives may be greater than one because in some cases, a malicious injection may be what causes malfunction and that is not entirely the fault of the developer.

In some aspects, if a new file is scanned by malware scanner 128 and is found to be malicious (e.g., containing malware), proactive defense module 108 may generate a rule that prevents the file from being uploaded into a computing device through a script's execution.

Figure 2:
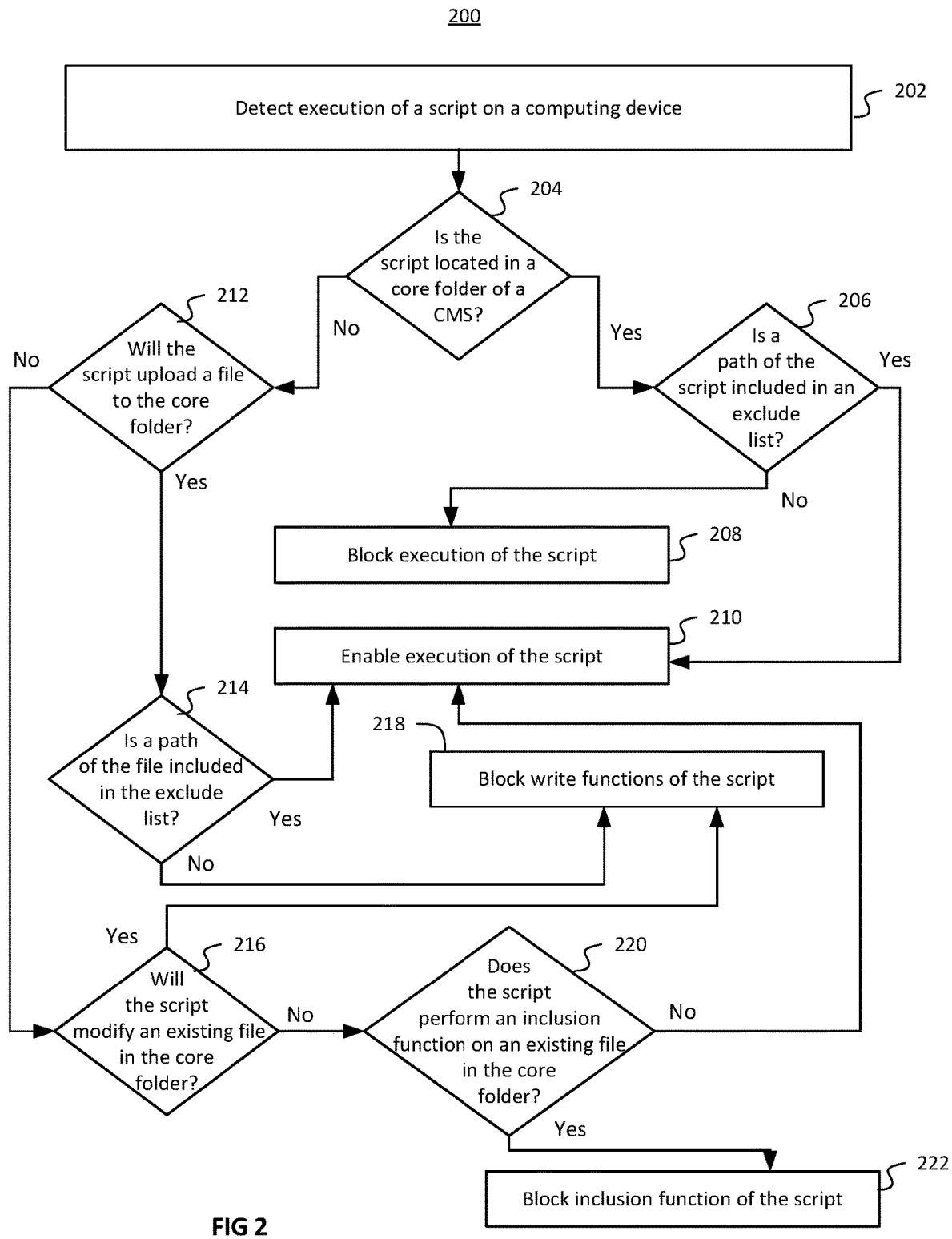
FIG. 2 illustrates a flow diagram of a method for protecting core files in a CMS.

FIG. 2 illustrates a flow diagram of method 200 for protecting core files in a CMS. At 202, proactive defense module 108 detects execution of a script (e.g., script 104) on a computing device (e.g., computing device 101a).

At 204, proactive defense module 108 determines whether the script is located in a core folder of a CMS (e.g., CMS core directory 102). In response to determining that the script is located in the core folder, method 200 advances to 206, where proactive defense module 108 determines whether a path of the script is included in an exclude list (e.g., exclude list 120). In some aspects, the exclude list is generated by an exclude list composer application that generates the exclude list by retrieving files and file paths for one or more of: (1) a latest version of the CMS, (2) previous version(s) of the CMS, (3) testing version(s) of the CMS, and (4) verified 3$^{rd}$-party tools for the CMS.

In response to determining that the path of the script is not in the exclude list, method 200 advances to 208, where proactive defense module 108 blocks execution of the script. In some aspects, the blocking is performed on the RINIT level. If proactive defense module 108 determines that the path is in the exclude list, however, method 200 advances to 210, where proactive defense module 108 enables execution of the script (i.e., does not interfere in its execution).

Returning to 204, if proactive defense module 108 determines that the script is not located in the core folder of the CMS, method advances to 212, where proactive defense module 108 analyzes the contents of the script to determine if the script will upload a file (e.g., folder 106) to the core folder (e.g., if the script includes write functions that place a file in the core folder). In response to determining that the script will upload a file to the core folder, method 200 advances to 214, where proactive defense module 108 determines if the path of the file is included in the exclude list. In response to determining that the path of the file is included in the exclude list, method 200 advances to 210. However, if proactive defense module 108 determines that the path of the file is not included in the exclude list, method 200 advances to 218, where proactive defense module 108 blocks write functions of the script (to prevent the upload of the file). In some aspects, proactive defense module 108 does not block all other functions in the script that are not write functions.

In some aspects, proactive defense module 108 may further evaluate whether the script is in the exclude list before advancing from 214 to 218. If a script is in the exclude list, but the file is not in the exclude list, proactive defense module 108 identifies a malicious injection in the script and blocks functions associated with the malicious injection (rather than all write functions). Proactive defense module 108 may confirm that the file is malicious by scanning the file for malware. If no malware is detected, in some aspects, proactive defense module 108 may generate a custom exclusion entry via exclude list composer 124.

Returning to 212, if proactive defense module 108 determines that the script will not upload a file to the core folder, method 200 advances to 216, where proactive defense module 108 determines whether the script will modify an existing file in the core folder. In response to determining that the script will modify an existing file, method 200 advances to 218, where proactive defense module 108 blocks write functions of the script. This is to prevent scripts that are not core files from modifying other core files in the core folder. In some aspects, proactive defense module 108 does not block all other functions in the script that are not write functions.

In response to determining that the script will not modify an existing file, method 200 advances to 220, where proactive defense module 108 determines whether the script will perform an include function on an existing file in the core folder. In response to determining that the script will perform such an include function, method 200 advances to 222, where proactive defense module 108 blocks said include function of the script. Otherwise, method 200 advances to 210. This is to prevent scripts that are not core files from including other core files in the core folder. In some aspects, proactive defense module 108 does not block all other functions in the script that are not include functions.

It should be noted that proactive defense module 108 may further evaluate whether the script is in the exclude list before advancing from 220 to 222 and from 216 to 218. This may be to confirm if the script can modify/include core files despite conventional rules in which only core scripts can modify/include core files.

Figure 3:
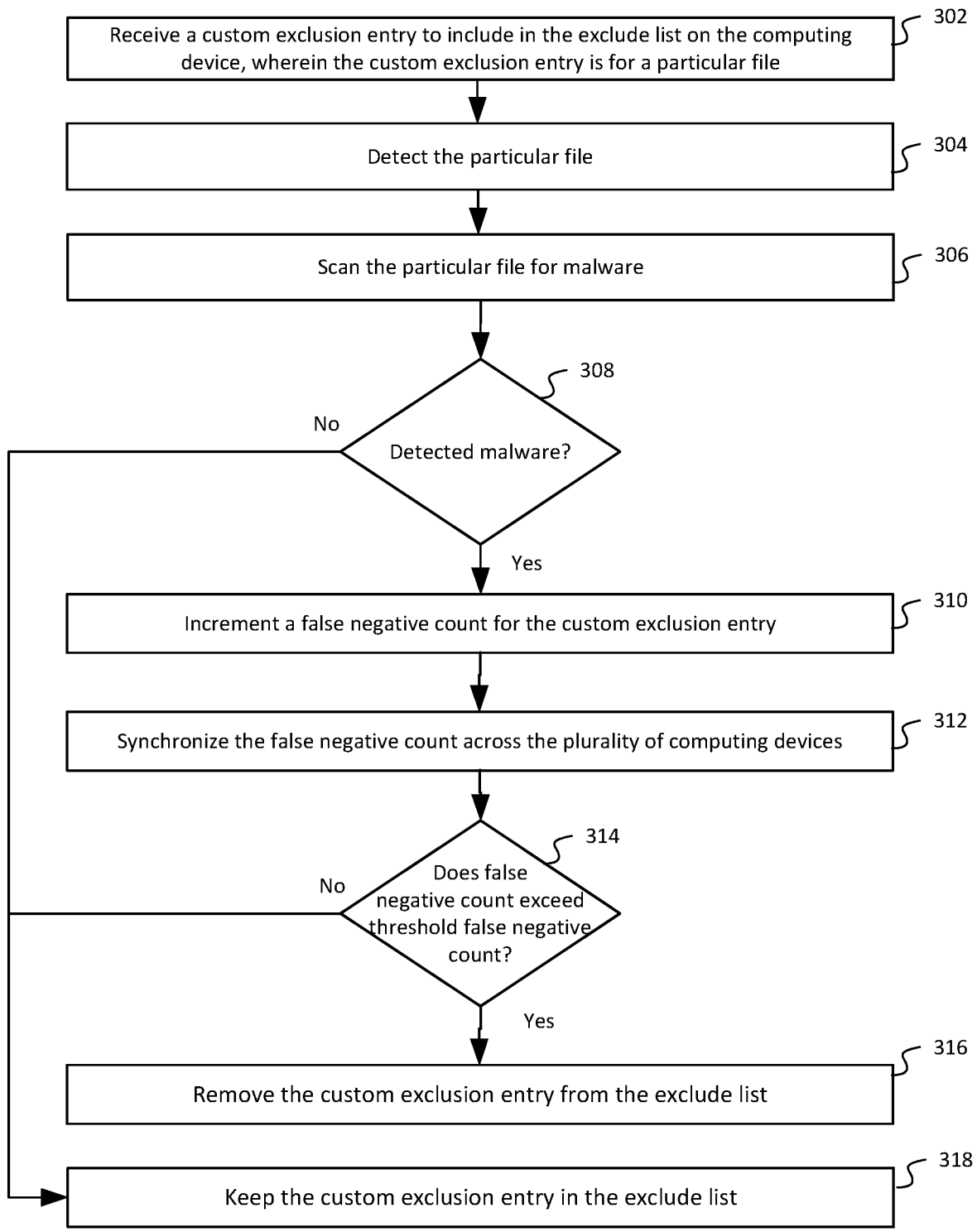
FIG. 3 illustrates a flow diagram of a method for evaluating a custom exclusion entry.

FIG. 3 illustrates a flow diagram of method 300 for evaluating a custom exclusion entry. At 302, proactive defense module 108 receives a custom exclusion entry to include in the exclude list on the computing device, wherein the custom exclusion entry is for a particular file. For example, the custom exclusion entry may be an identifier of the particular file (e.g., a path to the particular file). At 304, proactive defense module 108 detects the particular file (e.g., during a periodic scan or when the exclusion is evaluated during a script execution). At 306, proactive defense module 108 scans the particular file for malware (e.g., via malware scanner 128). At 308, proactive defense module 108 determines whether malware was detected. In response to detecting malware during the scan of the particular file, method 300 advances to 310, where proactive defense module 108 increments a false negative count for the custom exclusion entry (e.g., increases count by 1).

At 312, proactive defense module 108 synchronizes the false negative count across the plurality of computing devices. At 314, proactive defense module 108 determines whether the false negative count exceeds the threshold false negative count. For example, the threshold may be 3 and the false negative count may be 1. Whenever the custom exclusion entry is detected on any of the computing devices (e.g., connected in an office environment), the false negative count for the custom exclusion entry is thus increased and synchronized.

In response to determining that the false negative count exceeds the threshold false negative count, method 300 increases to 316, where proactive defense module 108 removes the custom exclusion entry from the exclude list and synchronizes the list across all of the computing devices in the network. If at 308, no malware is detected or if at 314, the false negative count does not exceed the threshold false negative count, method 300 advances to 318, where proactive defense module 108 keeps the custom exclusion entry in the exclude list.

In some aspects, proactive defense module 108 may track a separate false negative count for the develop associated with the particular file. In response to detecting malware in the particular file at 308, proactive defense module 108 may increment another false negative count for the developer at 310. At 314, proactive defense module 108 may determine whether the another false negative count exceeds another threshold false negative count, and if so, may remove all exclusion entries associated with the developer from the exclude list at 316.

Figure 4:
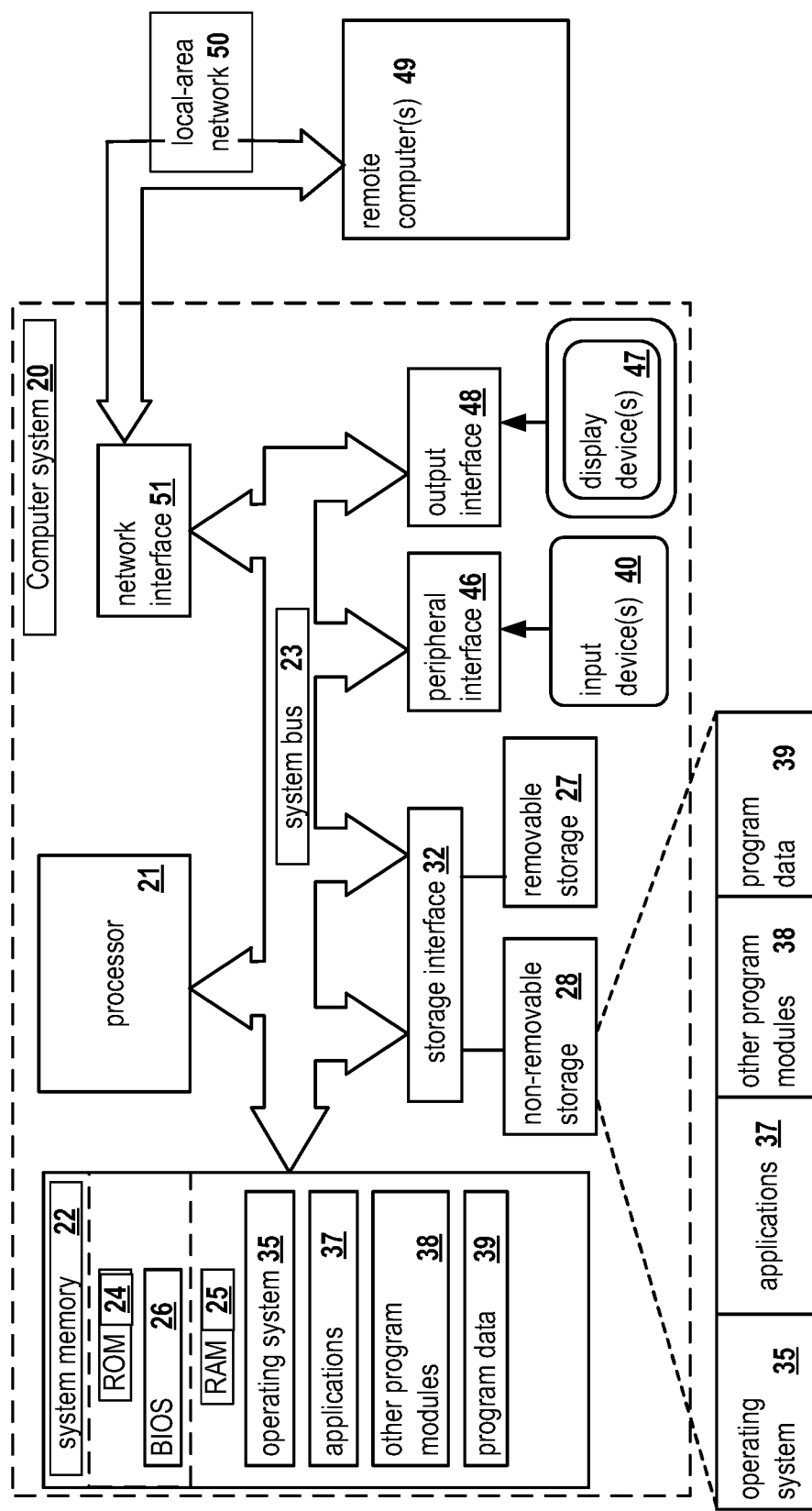
FIG. 4 presents an example of a general-purpose computer system on which aspects of the present disclosure can be implemented.

FIG. 4 is a block diagram illustrating a computer system 20 on which aspects of systems and methods for protecting core files in a CMS may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting core files in a content management system (CMS), the method comprising:
   detecting execution of a script on a computing device;
   determining whether the script is located in a core folder of the CMS;
   in response to determining that the script is located in the core folder, determining whether a path of the script is included in an exclude list that comprises paths of scripts and files that are marked as not malicious;

in response to determining that the path of the script is not in the exclude list, blocking the execution of the script;

in response to determining that the script is not located in the core folder, determining whether the script will upload, to the core folder, a file that is not in the exclude list;

in response to determining that the script will upload the file to the core folder, blocking write functions in the script during the execution.

2. The method of claim 1, wherein blocking the write functions in the script during the execution further comprises executing all other functions in the script that are not the write functions.

3. The method of claim 1, further comprising:
in response to determining that the script is in the exclude list, determining whether the script will upload, to the core folder, a file that is not in the exclude list; and
in response to determining that the script will upload the file to the core folder, identifying a malicious injection in the script and blocking functions associated with the malicious injection.

4. The method of claim 1, wherein blocking the execution of the script further comprises:
determining whether the script performs an include function or modification on an existing file in the core folder, wherein the existing file is in the exclude list;
in response to determining that the script performs an include function or modification on the existing file in the core folder, blocking the include function or write functions associated with the modification.

5. The method of claim 1, wherein blocking the execution of the script occurs on a RINIT level.

6. The method of claim 1, further comprising:
generating the exclude list by retrieving files and file paths for one or more of:
(1) a latest version of the CMS,
(2) previous version(s) of the CMS,
(3) testing version(s) of the CMS,
(4) verified $3^{rd}$-party tools for the CMS.

7. The method of claim 1, wherein the exclude list is synchronized across a plurality of computing devices that comprises the computing device.

8. The method of claim 7, further comprising:
receiving a custom exclusion entry to include in the exclude list on the computing device, wherein the custom exclusion entry is for a particular file;
detecting the particular file;
scanning the particular file for malware;
in response to detecting malware in the particular file, incrementing a false negative count for the custom exclusion entry;
synchronizing the false negative count across the plurality of computing devices; and
in response to determining that the false negative count exceeds a threshold false negative count, removing the custom exclusion entry from the exclude list.

9. The method of claim 8, further comprising:
identifying a developer associated with the particular file;
in response to detecting malware in the particular file, incrementing another false negative count for the developer;
in response to determining that the another false negative count exceeds another threshold false negative count, removing all exclusion entries associated with the developer from the exclude list.

10. A system for protecting core files in a content management system (CMS), comprising:
a memory; and
a hardware processor communicatively coupled with the memory and configured to:
detect execution of a script on a computing device;
determine whether the script is located in a core folder of the CMS;
in response to determining that the script is located in the core folder, determine whether a path of the script is included in an exclude list that comprises paths of scripts and files that are marked as not malicious;
in response to determining that the path of the script is not in the exclude list, block the execution of the script;
in response to determining that the script is not located in the core folder, determine whether the script will upload, to the core folder, a file that is not in the exclude list;
in response to determining that the script will upload the file to the core folder, block write functions in the script during the execution.

11. The system of claim 10, wherein the hardware processor is further configured to block the write functions in the script during the execution while executing all other functions in the script that are not the write functions.

12. The system of claim 10, wherein the hardware processor is further configured to:
in response to determining that the script is in the exclude list, determine whether the script will upload, to the core folder, a file that is not in the exclude list; and
in response to determining that the script will upload the file to the core folder, identify a malicious injection in the script and blocking functions associated with the malicious injection.

13. The system of claim 10, wherein the hardware processor is further configured to block the execution of the script by:
determining whether the script performs an include function or modification on an existing file in the core folder, wherein the existing file is in the exclude list;
in response to determining that the script performs an include function or modification on the existing file in the core folder, blocking the include function or write functions associated with the modification.

14. The system of claim 10, wherein blocking the execution of the script occurs on a RINIT level.

15. The system of claim 10, wherein the hardware processor is further configured to:
generate the exclude list by retrieving files and file paths for one or more of:
(1) a latest version of the CMS,
(2) previous version(s) of the CMS,
(3) testing version(s) of the CMS,
(4) verified $3^{rd}$-party tools for the CMS.

16. The system of claim 10, wherein the exclude list is synchronized across a plurality of computing devices that comprises the computing device.

17. The system of claim 16, wherein the hardware processor is further configured to:
receive a custom exclusion entry to include in the exclude list on the computing device, wherein the custom exclusion entry is for a particular file;
detect the particular file;
scan the particular file for malware;
in response to detecting malware in the particular file, increment a false negative count for the custom exclusion entry;

synchronize the false negative count across the plurality of computing devices; and in response to determining that the false negative count exceeds a threshold false negative count, remove the custom exclusion entry from the exclude list.

18. The system of claim 17, wherein the hardware processor is further configured to:

identify a developer associated with the particular file;

in response to detecting malware in the particular file, increment another false negative count for the developer;

in response to determining that the another false negative count exceeds another threshold false negative count, remove all exclusion entries associated with the developer from the exclude list.

19. A non-transitory computer readable medium storing thereon computer executable instructions for protecting core files in a content management system (CMS), including instructions for:

detecting execution of a script on a computing device;

determining whether the script is located in a core folder of the CMS;

in response to determining that the script is located in the core folder, determining whether a path of the script is included in an exclude list that comprises paths of scripts and files that are marked as not malicious;

in response to determining that the path of the script is not in the exclude list, blocking the execution of the script;

in response to determining that the script is not located in the core folder, determining whether the script will upload, to the core folder, a file that is not in the exclude list;

in response to determining that the script will upload the file to the core folder, blocking write functions in the script during the execution.

* * * * *